(12) United States Patent
Steffen et al.

(10) Patent No.: US 7,315,099 B2
(45) Date of Patent: Jan. 1, 2008

(54) COOLED ELECTRIC DRIVE UNIT FOR A MOTOR VEHICLE

(75) Inventors: Jens Steffen, Raisting (DE); Roland Hagenlocher, Planegg (DE); Fritz Walter, Raisting (DE); Anton Müller, Tutzing (DE); Peter Ehrhart, München (DE)

(73) Assignee: Magnet-Motor Gesellschaft fuer mangnetmotorische Technik mbH, Starnberg (DE)

( * ) Notice: Subject to any disclaimer, the term of this patent is extended or adjusted under 35 U.S.C. 154(b) by 0 days.

(21) Appl. No.: 11/044,732

(22) Filed: Jan. 28, 2005

(65) Prior Publication Data

US 2005/0206250 A1   Sep. 22, 2005

(30) Foreign Application Priority Data

Jan. 29, 2004   (DE)   ................... 10 2004 004 617
Sep. 15, 2004  (DE)   ................... 10 2004 044 688

(51) Int. Cl.
*H02K 9/19*  (2006.01)
*H02K 9/197*  (2006.01)

(52) U.S. Cl. .................. 310/54; 310/58; 310/67 R; 310/83; 180/65.5

(58) Field of Classification Search .................. 310/58, 310/59, 52; 30/67 R, 83, 75 R, 54; 180/65.1, 180/65.5, 65.6
See application file for complete search history.

(56) References Cited

U.S. PATENT DOCUMENTS

| | | | | |
|---|---|---|---|---|
| 2,019,025 A * | 10/1935 | Spear et al. | ................. | 114/337 |
| 3,035,652 A | 5/1962 | McLean | | |
| 3,770,074 A * | 11/1973 | Sherman | .................... | 180/65.6 |
| 3,812,928 A * | 5/1974 | Rockwell et al. | .......... | 180/65.5 |
| 4,547,688 A * | 10/1985 | Hammer et al. | .............. | 310/59 |
| 4,799,564 A | 1/1989 | Iijima et al. | | |
| 5,327,034 A | 7/1994 | Couture et al. | | |
| 5,450,915 A * | 9/1995 | Li | .............................. | 180/65.5 |
| 5,472,059 A * | 12/1995 | Schlosser et al. | .......... | 180/65.5 |
| 5,657,830 A * | 8/1997 | Kawashima et al. | ........ | 180/220 |
| 5,789,833 A * | 8/1998 | Kinoshita et al. | ............. | 310/64 |
| 6,222,289 B1 * | 4/2001 | Adames | ....................... | 310/54 |
| 6,276,475 B1 * | 8/2001 | Nakanosono | .............. | 180/65.8 |
| 6,355,996 B1 * | 3/2002 | Birkestrand | ................... | 310/54 |
| 6,629,574 B2 * | 10/2003 | Turner | ........................ | 180/206 |
| 6,974,399 B2 * | 12/2005 | Lo | ................ | 475/5 |
| 7,214,155 B2 * | 5/2007 | Mueller et al. | ................ | 475/5 |

(Continued)

FOREIGN PATENT DOCUMENTS

CA    2 347 281    11/2002

(Continued)

*Primary Examiner*—Karl Tamai
(74) *Attorney, Agent, or Firm*—Venable LLP; Robert Kinberg; Steven J. Schwarz

(57) ABSTRACT

An electric drive unit for a motor vehicle, comprising:
(a) a stub axle;
(b) an electric motor having a stator that is fixed with respect to the stub axle and having a rotor that is rotatably supported with respect to the stub axle;
(c) a gear system having its input connected to the rotor for torque transmission;
(d) a wheel carrier that is rotatably supported with respect to the stub axle and is connected to the output of the gear system for torque transmission;
characterized in
(e) that air cooling with air circulation is provided for cooling the rotor of the electric motor;
(f) and in that the electric motor has provided therein a heat sink for taking up heat from the circulating air.

19 Claims, 4 Drawing Sheets

U.S. PATENT DOCUMENTS

| | | |
|---|---|---|
| 2003/0173839 A1* | 9/2003 | Torii et al. ................. 310/52 |
| 2004/0150270 A1* | 8/2004 | Nagayama et al. .......... 310/61 |
| 2004/0238242 A1* | 12/2004 | Honda et al. .............. 180/65.1 |
| 2005/0140230 A1* | 6/2005 | Johnson et al. ............ 310/112 |
| 2005/0245341 A1* | 11/2005 | Mueller et al. ............... 475/5 |

FOREIGN PATENT DOCUMENTS

| | | | |
|---|---|---|---|
| DE | 42 14 716 | | 11/1992 |
| DE | 44 04 926 | | 8/1995 |
| DE | 198 05 679 | | 8/1999 |
| EP | 1109298 | * | 6/2001 |
| WO | WO-02/087914 | | 11/2002 |
| WO | WO-03/065546 | | 8/2003 |

* cited by examiner

COOLED ELECTRIC DRIVE UNIT FOR A MOTOR VEHICLE

Subject matter of the invention is an electric drive unit for a motor vehicle, comprising:
(a) a stub axle;
(b) an electric motor having a stator that is fixed with respect to the stub axle and having a rotor that is rotatably supported with respect to the stub axle;
(c) a gear system having its input connected to the rotor for torque transmission;
(d) a wheel carrier that is rotatably supported with respect to the stub axle and is connected to the output of the gear system for torque transmission;

characterized in
(e) that air cooling with air circulation is provided for cooling the rotor of the electric motor;
(f) and in that the electric motor has provided therein a heat sink for taking up heat from the circulating air.

The air cooling preferably makes use of a circulating airflow and is designed such that at least part of the circulating airflow flows along a surface that is thermally accessible from the gear system so that a substantial part of the lost heat of the gear system is transferred to the circulating airflow.

The invention realizes the novel concept of re-cooling the heat-absorbing, circulating air, which preferably has a circulating airflow, by means of a heat sink provided for this purpose. This is fundamentally different from e.g. continuous drawing in of fresh air and continuous blowing out of heated air.

Preferred developments of the heat sink are a heat dissipating metal member, in particular of metal with good thermal conductivity, a region of increased surface area and an air/liquid heat exchanger. The heat sink transfers the heat absorbed by the same at a "thermally downstream" location. In case of said air/liquid heat exchanger, the transfer takes place to liquid. Another example is the transfer by thermal conduction to a cooler portion of the electric motor.

Although the air cooling mentioned may be sufficient in principle for cooling both of the rotor and of the stator, it is preferred to provide a liquid cooling for cooling the stator of the electric motor. The amount of lost heat generated in the stator usually is a multiple of the amount of lost heat generated in the rotor.

The electric motor may be designed with external rotor or with internal rotor.

At locations at which a heat transfer is to be effected from a solid material surface to air or vice versa (i.e. in particular at the rotor and/or the heat sink and/or the surface of the gear system facing the electric motor), a further development of the invention provides for features for improving the heat transfer. In this context, there should be mentioned in particular: surface roughness (even including small pointed projections or formation of fine grooves) in order to at least partly penetrate the interface layer adhering on the surface; turbulence generators e.g. in the sense of a surface profiling; flow directing areas acting like blades in order to generate an airflow.

The rotor preferably has openings extending between the rotor side closer to the gear system and the rotor side remoter from the gear system. By means of these openings, the airflow may be guided in more favorable manner.

The wheel carrier preferably has a tire rim mounted thereon.

Further subject matter of the invention is a motor vehicle comprising at least one electric drive unit or a wheel drive unit (i.e. an electric drive unit plus a motor vehicle wheel mounted on the wheel carrier of the drive unit) as disclosed in the present application.

The following statements in the general part of the description at various locations refer primarily to an "electric drive unit with cooling of the gear system by way of heat discharge to the airflow circulating in the electric motor" and to an "air/liquid heat exchanger for re-cooling the airflow" and to an "electric motor with external rotor" and an "air-cooled stator". It is emphasized that the following statements in the general part of the description apply analogously also to electric drive units in which there is no substantial part of the lost heat of the gear system discharged to the airflow and/or in which there is no air/liquid heat exchanger provided in the airflow and/or in which there is provided an internal rotor and/or in which there is provided a liquid cooling for the stator.

The cooling system provided according to the invention in the drive unit is composed such that—during operation of the drive unit—lost heat of the electric motor (mainly due to so-called iron losses as a result of continuous magnetic reversal of wound poles and due to so-called copper losses because of the electric resistance of the wires for winding on the stator poles) is discharged to the airflow circulating within the electric motor. In technical practical application, the overall lost heat is not discharged to the circulating airflow to 100%, since e.g. the motor housing also discharges heat, that was fed thereto directly, to the external surroundings. For re-cooling the airflow, there is provided an air/liquid heat exchanger. The heat taken up in the heat exchanger from the liquid, after all, has to be discharged towards the outside, usually via a liquid/air heat exchanger for discharge to the ambient air. Another specific feature of the cooling system consists in that it is also provided for specific discharge of lost heat of the gear system (again usually not of the entire lost heat of the gear system, since part of the lost heat of the gear system is discharged to the outside e.g. via housing portions of the gear system that do not participate in the function of the cooling system). According to the invention, the cooling system is designed such that at least part of the circulating airflow flows along a surface that receives heat from the gear system. The following statements will demonstrate more clearly that this surface which is cooled by flowing the circulating airflow therealong, may either be part of the gear system and/or part of the electric motor to which heat from the gear system is transferred in arbitrary manner. In the drive unit according to the invention, the cooling system thus provides both for cooling of the electric motor and for cooling of the gear system. It is thus possible to build the gear system with higher density of the transmission capacity than so far, as lost heat is dissipated with higher efficiency from the gear system.

The primary take-up of lost heat by the circulating airflow has the advantage that the airflow may be contacted in particularly uncomplicated manner with the components of the electric motor that are important in this regard, even though these are components of complex geometry. As an example, the winding heads of the wound coils of the poles are indicated. The (overall) airflow may also be branched e.g. to several partial airflows over part of the circulation path thereof.

The cooling system employed according to the invention is designed such that the heat discharge capacity of the same is sufficient for accommodating the necessary heat discharge from the electric motor and for accommodating the necessary heat discharge from the gear system, without this causing undesirably high temperatures of the circulating airflow or of the components of the electric motor and of the gear system. The heat discharge capacity of the cooling system as a rule is higher than would be measured in case of a design in which the cooling system indeed discharges heat from the electric motor, but discharges substantially no heat from the gear system.

The electric motor preferably is designed as an electric motor with external rotor. Even more preferred is a design with external rotor having a substantially radially extending rotor bottom, with the rotor bottom being located on the side of the electric motor facing the gear system.

According to a further development of the invention, the air gap between the gear system and the rotor bottom is designed to enhance the heat transport from the gear system to the rotor bottom. Preferred measures to this end are: narrow design of the air gap; increasing the surface area, in particular a design having ribs, on the gear system and/or the rotor bottom; turbulence generators which at the same time may constitute an increase in surface area, on the gear system and/or the rotor bottom. Turbulence generators promote the effect that the air in the air gap does not remain in a too resting state; the result is an improved heat transfer from the gear system to the air in the air gap and from the air in the air gap to the rotor bottom. In addition thereto, the exchange of air from the air gap to the adjoining space of the motor interior is improved.

A more radical approach of discharging heat from the air gap results in accordance with a further development of the invention, when there are openings provided in the radially inner portion of the air gap, with these openings extending through the rotor bottom. These openings advantageously may be circumferentially distributed on the rotor bottom. The openings provide the most important prerequisite to the effect that a partial airflow flows through the air gap. This partial airflow directly dissipates heat from the adjacent surface part of the gear system and thus away from the gear system. In addition thereto, there is an enhanced thermal transfer across the air gap to the rotor bottom as compared to the situation in which the air in the air gap would be quasi at rest.

The rotor bottom, on its side facing the gear system, may have flow directing areas acting like blades in order to generate an airflow with a radial component in the air gap. The flow directing areas may be designed such that the circulation of the airflow is effected by these areas or is effected by these areas to a large extent.

The drive unit preferably is designed such that the following circulation path of the airflow results: The airflow or the part of the airflow flowing on the side of the rotor bottom directed away from the gear system, flows outwardly with a radial component between the rotor bottom and a face side of the stator; the airflow or part of the airflow then flows with an axial component through the cylindrical air gap between stator and rotor; the airflow or part of the airflow then preferably flows outwardly with a radial component between a face side of the rotor and a counter-surface of the stator; the airflow or part of the airflow then flows inwardly with a radial component; finally, the circulation path of the airflow terminates with an axial component of the flow.

The rotor bottom, on its side directed away from the gear system and/or said face side of the rotor is provided with flow directing areas acting like blades, in order to generate an airflow with a radial component. These flow directing areas may effect the circulation of the airflow or part of the circulation of the airflow.

Preferably, an installation member on the rotor bottom, in particular a plate-shaped carrier of a resolver for providing rotational position information of the rotor, is formed as a thin member for the purpose of improving the thermal conduction. Plate-like carriers of resolvers typically consist of fiber-reinforced plastics material. In accordance with the further development of the invention mentioned, a plate thickness of 0.25 to 0.5 mm is employed, whereas former plate thicknesses used were around 1.5 mm.

The openings in the rotor bottom and, optionally, the flow directing areas acting like blades preferably are designed such that part of the overall airflow passes through the air gap between gear system and rotor bottom and part of the overall airflow passes along the side of the rotor bottom directed away from the gear system. The ratio of the flow quantities between these two partial flows is decided best on the basis as to how much heat has to be discharged from which heat source.

The air/liquid heat exchanger mentioned may be placed radially inside, on the portion of the stator that is active for the motor function (where there is usually sufficient room present), or on the face side, on a suitable portion of the stator, preferably on the face side on the active portion for the motor function. The active portion of the stator, which is active for the motor function, is the portion comprising the stator poles and—in most embodiments—comprising the wound coils of the stator.

The confining wall of the gear system directed towards the electric motor preferably is a rotating part, and still more preferably the speed of this confining wall is different from the speed of the rotor of the electric motor.

Additional preferred developments of the invention are indicated in the following numbered paragraphs. The features mentioned there, in so far as additional explanations are called for, will be explained in more detail in the embodiments further below:

1. A drive unit,
   characterized in that the gear system is a planetary gear system comprising a sun wheel, planet wheels, a planet carrier and a ring gear.
2. A drive unit,
   characterized in that the planetary gear system is a planetary gear system with stepped planet wheels.
3. A drive unit,
   characterized in that the gear system is adapted to be unmounted from the drive system in the form of a module.
4. A drive unit,
   characterized in that the gear system module is adapted to be unmounted together with a wheel carrier part.
5. A drive unit,
   characterized in that the main part of the rotor of the electric motor, upon release thereof from its bearing portion, is adapted to be unmounted from the drive unit in axial direction.
6. A drive unit,
   characterized in that the stator of the electric motor is adapted to be unmounted from the drive unit in axial direction.
7. A drive unit,
   characterized in that the wheel carrier has a tire rim, preferably a standard rim, mounted thereon.

8. A drive unit,
   characterized in that the wheel carrier has a chain wheel mounted thereon.
9. A drive unit,
   characterized in that the gear system is positioned on the side of the drive unit located towards the outside of the vehicle.
10. A drive unit,
    characterized in that the side of the wheel carrier directed away from the gear system is provided with a brake disk or a brake drum.
11. A drive unit,
    characterized in that a releasable connection is provided in the torque transmission path between the electric motor and the gear system.
12. A drive unit,
    characterized in that there is provided a plug system for connecting the electric motor electrically and in terms of cooling.
13. A drive unit,
    characterized in that the electric motor is adapted to be operated as a brake.
14. A drive unit,
    characterized in that the electric motor is designed with permanent-magnetic excitation on the rotor.

It is to be pointed out here that the term "wheel carrier" is not to be understood in a restrictive sense to the effect that it always has to be provided with a vehicle wheel during operation which performs a rolling motion on the ground or a prepared path. There are alternatives possible. As an additional preferred possibility, a chain wheel is cited driving e.g. a caterpillar track of a caterpillar vehicle, e.g. in case of an earth mover. An additional alternative is the attachment of a gear wheel on the wheel carrier which, e.g. in case of a cogwheel railway, may cooperate with a stationary toothed rack or, e.g. via rotary intermediate parts, may work on the driving wheel of a motor vehicle.

Examples of motor vehicles that preferably may be provided with the drive unit according to the invention are as follows: scooter-like motor vehicles for standing on; scooter-like motor vehicles for sitting on; small vehicles, in particular for airports and golf courts; motor vehicles of the type of passenger motor vehicles produced in millions of numbers, i.e. having typically one to seven seats and a roof; mini-busses and busses; trucks. For reasons that will still become clearer further below, the electric drive unit according to the invention is suited in particularly good manner for applications in which high driving torques or high driving powers for the motor vehicle are to be provided and for large/heavy motor vehicles. Examples in this regard are trucks and, in more general form, heavy transport vehicles. To be named as particularly suited vehicles are motor vehicles in which more than one or two motor vehicle wheels are driven by a respective electric drive unit, e.g. large/heavy transport vehicles with four or more driven wheels. Although the electric drive unit according to the invention has been developed primarily for installation in non-railbound motor vehicles, it may also be put to advantage for railbound vehicles.

There are motor vehicle applications in which it is advantageous to discharge the lost heat of the gear system not directly from the gear system to the ambient air (whereby the gear system necessarily constitutes a prominent "hot spot" of the motor vehicle, including e.g. a risk of injury due to accidental touching of the gear system wall). In case of the invention, the lost heat of the gear system finally is distributed at a different location and across a larger area and usually is discharged to the surroundings at a lower temperature level.

In case of electrically driven motor vehicles, the question arising is how the required electrical energy can be fed to the motor vehicle. In particular, the following possibilities are known: an accumulator from which electrical energy for the drive unit can be withdrawn (e.g. a scooter with accumulator); generation of electrical energy on board of the vehicle (e.g. combustion engine with current generator on board of the vehicle; fuel cell stack on board of the vehicle); transfer of electrical energy from outside into the motor vehicle (e.g. bus with current collector from an overhead line; railbound vehicle with current collector from an overhead line). The electric drive unit according to the invention is suited in particular for all of these types of electric energy connection.

A further subject matter of the invention is a wheel drive unit for a motor vehicle, comprising:
(a) an electric drive unit as disclosed in the present application;
(b) and a motor vehicle wheel mounted on the wheel carrier of the drive unit.

This wheel drive unit is a component which can be unmounted from the motor vehicle and mounted to the motor vehicle in the form of a unit. In addition to the mechanical attachment, merely the electrical connections and the connections in terms of cooling need to be established, in particular by a plug system.

Preferably the drive unit, if desired except for a partial region of the stub axle component on the vehicle side, and preferably inclusive of a possible brake disk or a possible brake drum, is accommodated substantially within the axial dimension of the motor vehicle wheel. Or in other words: the thus defined drive unit is substantially not wider in axial direction than the motor vehicle wheel and in essence does not project axially beyond the wheel on any of the two wheel sides.

The wheel drive unit preferably has at least one mounting portion where it is adapted to be mounted on a wheel suspension of the motor vehicle. This may be connecting locations for swinging arm-like components of the wheel suspension, but also a design of the stub axle component in the form of a component of the type of a steering knuckle, so that the entire wheel drive unit may be pivoted for steering the motor vehicle.

Still another subject matter of the invention is a motor vehicle comprising at least one drive unit as disclosed in the present application or at least one wheel drive unit as disclosed in the present application.

The motor vehicle equipped with the drive unit according to the invention or with the more complete wheel drive unit according to the invention, may be a motor vehicle in which steering of the wheels of one axle only is possible. However, it may also be a vehicle in which steering of the wheels of two axles or of the wheels of still more axles is possible. It may also be a vehicle in which steering of the wheels of all axles is possible.

The invention and preferred developments of the invention will be elucidated in more detail hereinafter by way of embodiments shown in the drawings in which.

Figure 1:
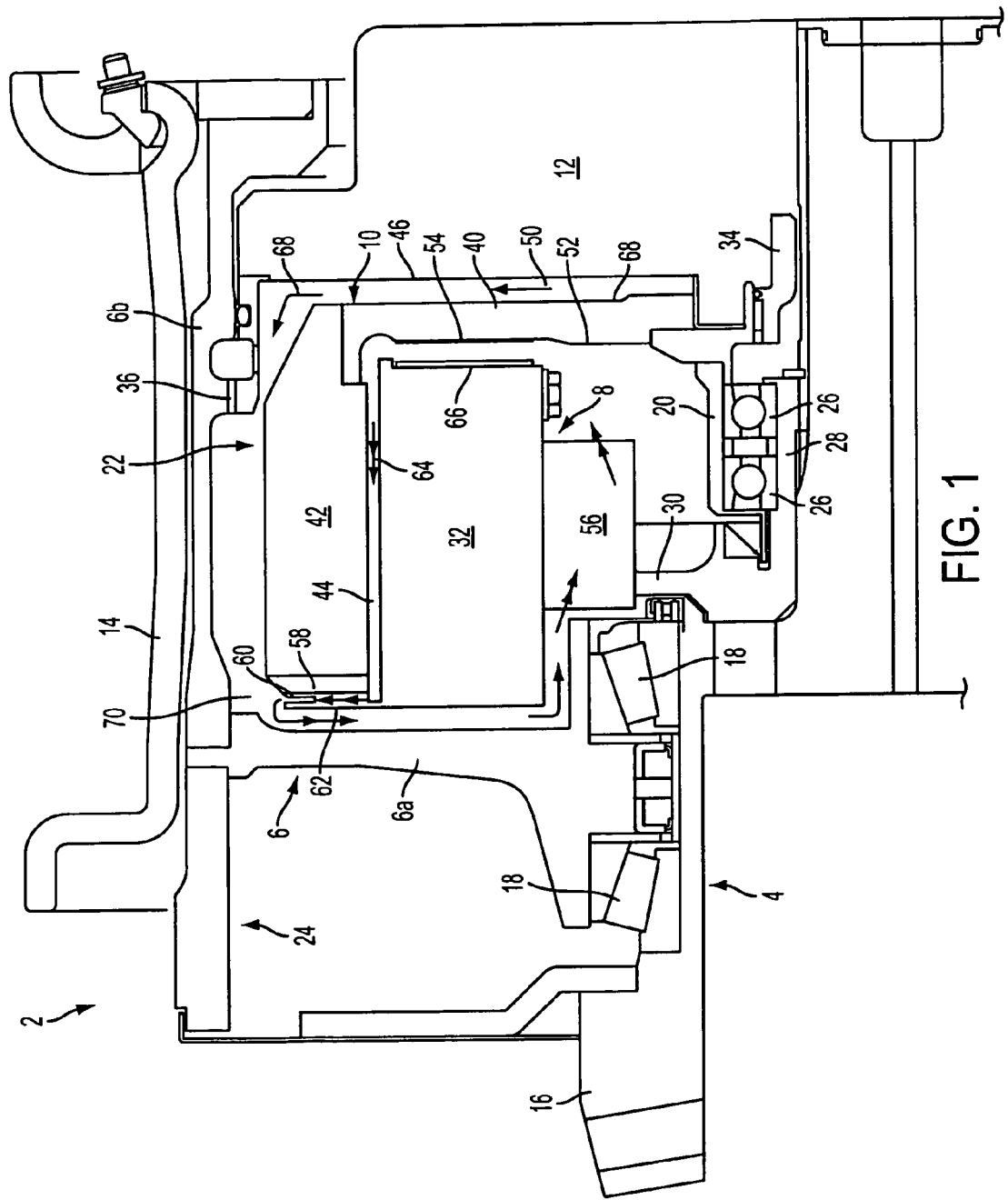
FIG. 1 shows an axial longitudinal sectional view of a first embodiment of a wheel drive unit or an electric drive unit for motor vehicles, illustrating merely an upper half, with the lower half being a mirror image thereof.

The wheel drive unit 2 illustrated in drawing FIG. 1 contains the following main components:
stub axle component 4,
wheel carrier 6,
stator 8 of an electric motor 22,
rotor 10 of electric motor 22,
gear system 12 in the form of a planetary gear system,
wheel rim 14,
tire (not shown) on wheel rim 14,
brake means 24.

By removing the wheel rim 14 along with the tire from the thus described wheel drive unit, one arrives at a drive unit according to the invention, comprising the main components wheel carrier 6, electric motor 22, gear system 12, optionally brake means 24. Illustrated to the left in FIG. 1 is the manner in which the stub axle component 4 merges with a mounting portion 16 (drawn concretely, an upper bore of two bores) on which the wheel drive unit is adapted to be mounted on a wheel suspension of a vehicle.

The stub axle component 4, which will be briefly referred to as stub axle 4 in the following, is of larger diameter in its left-hand portion in FIG. 1 and of smaller diameter in its right-hand, axially longer portion. On the larger diameter portion, there is supported the wheel carrier 6 by means of two tapered roller bearings 18.

The wheel carrier 6 in its entirety—roughly speaking—is cup-shaped and consists of a—roughly speaking—disc-shaped first part 6a and a substantially cylindrical part 6b. The wheel rim 14 is attached to the cylindrical part 6b (not shown explicitly).

The rotor 10 of the electric motor 22 is cup-shaped, with the cup being open towards the left-hand side in FIG. 1 and the central portion having threadedly mounted thereon a sleeve-shaped lug 20 projecting towards the left. Two axially spaced ball bearings 26 support the rotor 10 on the stub axle 4, with the intermediary of a sleeve-like extension 28 of stator 8 projecting to the right in FIG. 1.

The stator 8, further radially inside, is disc-shaped (cf. numeral 30) and then, still further radially inside, merges with the already mentioned extension 28. Further radially outside, the stator 8 is substantially widened in axial direction and at that location has its active portion 32 for the motor function, i.e. in essence its circumferentially distributed stator poles and the windings provided thereon, which is not explicitly illustrated.

The gear system 12 is a planetary gear system of basically known construction, so that it is not necessary to discuss the construction of gear system 12 in detail. However, for the sake of completeness, it should be mentioned that gear system 12 comprises a rotatably driven sun wheel, a rotatably supported planet carrier, a plurality of circumferentially distributed stepped planet wheels (with a first toothed portion on the larger diameter and a second toothed portion on the smaller diameter) arranged in the planet carrier for rotation of their own, as well as an internally toothed ring gear fixed on the stub axle 4 in non-rotatable manner. The sun wheel meshes with the first toothed portion of the respective planet wheel. The second toothed portions of the planet wheels mesh with the ring gear. The rotating planet carrier constitutes the transmission output of gear system 12. FIG. 1 schematically illustrates a torque transmission ring 34 coupled on the one hand with the rotor 10 in torque-transmitting manner and provided on the other hand, in its right-hand end portion in FIG. 1, with the sun wheel (not shown) that is attached in non-rotatable manner. The transmission output of gear system 12 is coupled to the cylindrical part 6b of the wheel carrier 6 via a torque-transmitting connection 36.

The rotor 10 of the electric motor 22 consists in essence of a substantially radially extending rotor bottom 40, radially further inside the already mentioned extension 20 for supporting the rotor 10, and radially outside an active portion 42 for the motor function, which extends substantially in circumferential direction and extends axially across a distance matching the axial length of the active stator portion 32. Between the active stator portion 32 and the active rotor portion 42, there is located a substantially cylindrical air gap 44 of the electric motor 22. Preferably, the electric motor is of the type having wound stator poles in the active portion 32 and permanent magnets on the inner circumference of the active portion 42 and having an electronically controlled current supply to the stator pole windings.

Between the, in FIG. 1, leftwardly directed confinement 46 of the gear system and the, in FIG. 1, rightwardly directed confinement 48 of the rotor bottom 40 there is located an air gap 50. Heat can be transferred from the gear system 12 transversely across the air gap 50 to the rotor bottom 40 provided, of course, that there is a temperature gradient present in this direction. It is emphasized that the rotor bottom 40 rotates at a speed that is several times higher than that of the transmission output of the gear system 12. In the embodiment illustrated, the area 46 constitutes part of the rotating planet carrier of the gear system 12.

The surface portion 52 of the rotor bottom 40 directed towards the left in FIG. 1 has a very thin carrier plate 54 of a resolver attached thereto.

The in terms of the motor function, active portion 32 of the stator 8 has an air/liquid heat exchanger 56 attached thereto radially inside. The heat exchanger 56, via two lines (not shown) finally extending through the stub axle 4 towards the left, is in liquid flow communication with a liquid/air heat exchanger on the vehicle, which discharges air via a large area to the ambient air. Imagine the disc-like portion 30 of the stator 8 to have an opening at the location where the heat exchanger is attached.

On the left-hand face side 58 of the rotor 10 in FIG. 1, there are provided flow directing members 60 acting like blades. In addition thereto, opposite the face side 58 of the rotor 10, there is provided a lengthened portion or extension 62 of the stator 8 radially towards the outside, so that a component of the electric motor 22 acting like a fan is formed by means of the flow directing members 60 between the face side 58 and the extension 62. Double-point arrows 64 indicate an airflow circulating inside the electric motor 22. Starting from the lower right, the airflow first passes with a radial component towards the outside through the space between the leftwardly directed surface 52 of the rotor bottom 40 and the rightwardly directed face side 66 of the stator portion 32, then passes with an axial component through the air gap 44, then with a radial component outwardly through the space between the left-hand face side 58 of the rotor 10 and the counter surface 62, then with a radial component inwardly and finally with an axial component through the heat exchanger 56 in order to be cooled there again to a lower temperature appropriate for the cooling function thereof.

Single-point arrows 68 illustrate an air swirling motion in the air gap 50. The air gap 50 is narrow for providing as good as possible heat transfer. The rightwardly directed surface 48 of the rotor bottom 40 preferably is provided with turbulence generators, not shown. Air in the air gap 50 is thus kept in a certain motion, and there is sufficient exchange of air taking place in the portion designated 70 with the airflow 64 proper.

The wheel drive unit or electric drive unit 2 according to FIG. 2 differs from the wheel drive unit or electric drive unit of FIG. 1 merely in the following items.

At a location relatively far radially inside, but still somewhat further radially outside than the extension 20, there are provided openings 72 extending in slightly inclined manner (on the right-hand side in FIG. 2 somewhat further radially outside) through the rotor bottom 40. There are provided several of these openings 72 in a manner distributed over the circumference of the rotor bottom 40. On its surface 48 directed towards the right in FIG. 2, the rotor bottom 40 is provided with flow directing members (not shown) acting like blades. Due to the design described, there are, in the region of the rotor bottom 40, a first partial airflow 74 between the rotor bottom 40 and the stator portion 32 as well as a second partial airflow 76 between the rotor bottom 40 and the gear system confinement 46. The two partial airflows are united further downstream. In this manner, the air gap 50 is cooled in more intensive manner than in case of the embodiment according to FIG. 1.

Figure 2:
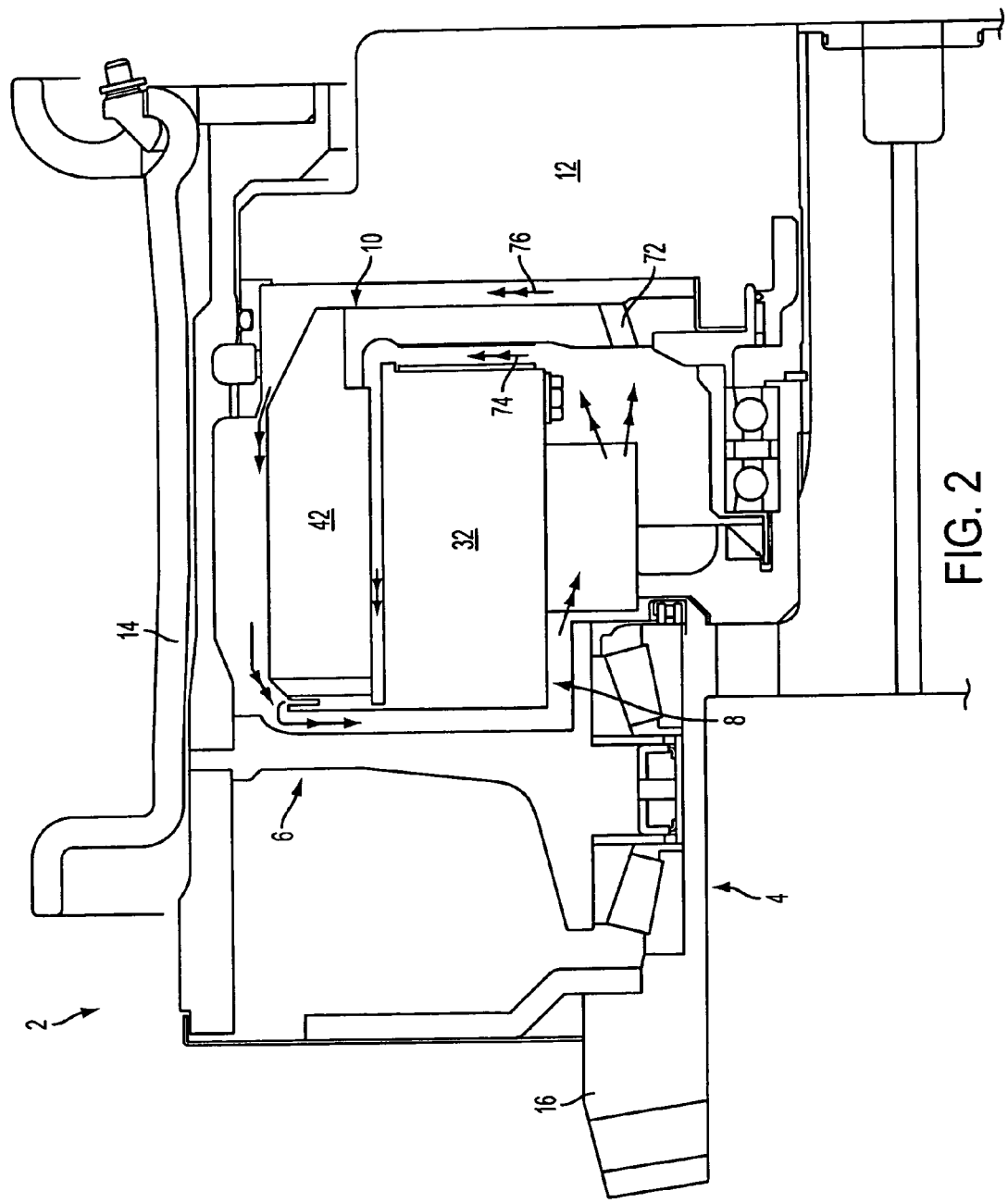
FIG. 2 shows an axial longitudinal sectional view of a second embodiment of a wheel drive unit or an electric drive unit, illustrating merely an upper half, with the lower half being a mirror image thereof.
Figure 3:
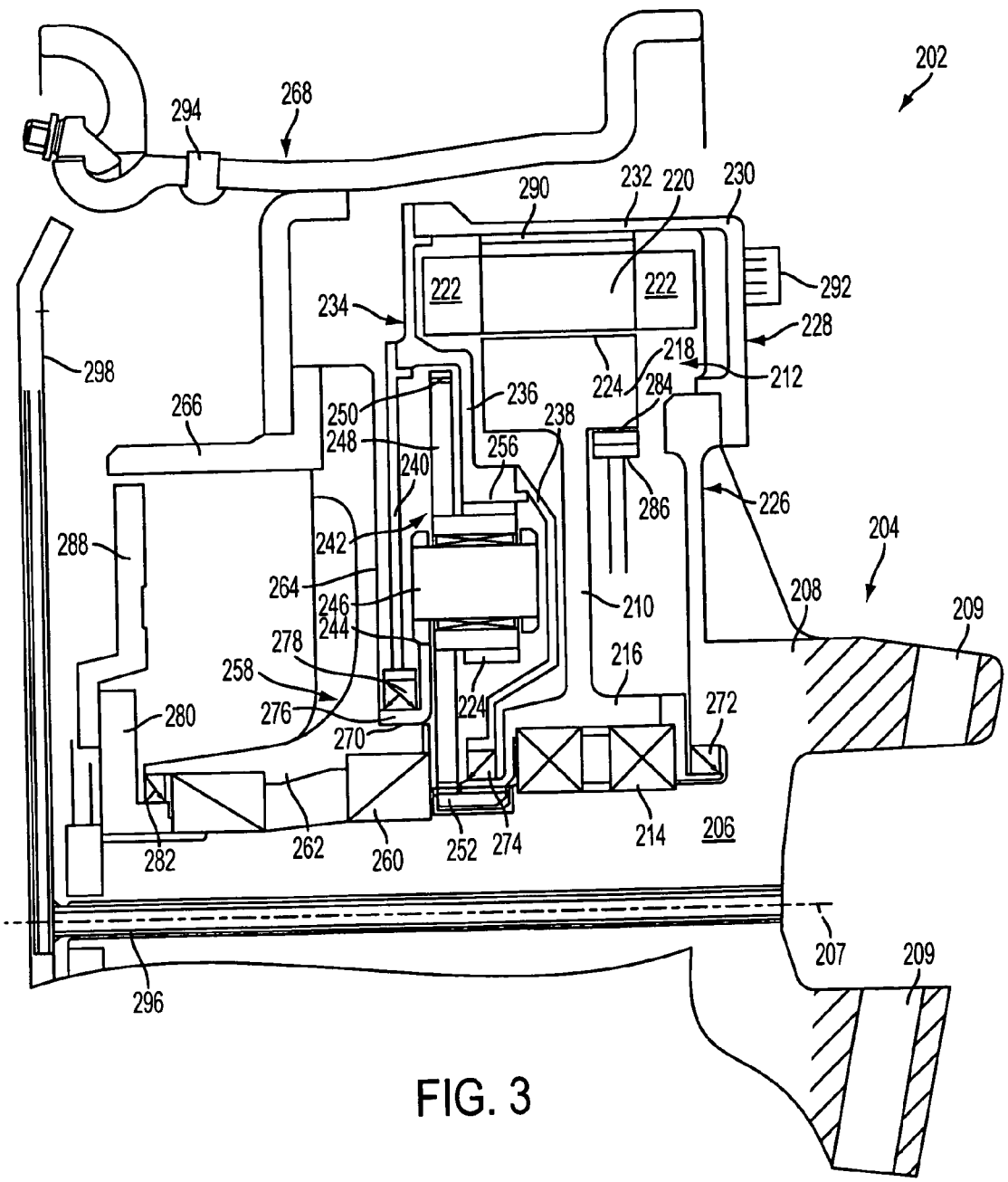
FIG. 3 shows an axial longitudinal sectional view of a third embodiment of a wheel drive unit or an electric drive unit for motor vehicles, illustrating merely an upper half, with the lower half being a mirror image thereof.

Looking at FIG. 1 and FIG. 2, it is easily conceivable that the gear system 12 can be withdrawn in the form of a module from the wheel drive unit 2 in axial direction, with the cylindrical part 6b of the wheel carrier 6 being withdrawn as well and the sun wheel of the gear system 12 being withdrawn from the torque transmission ring 34. Furthermore, the rotor may also be axially unmounted from the drive unit, upon release of the illustrated screw-type connection with its central portion. The stator 8, too, can be unmounted in axial direction towards the right. One can imagine that a plug system, not illustrated, for connecting the electric motor 22 electrically and in terms of cooling to the interior of the vehicle, is inserted from the left into the stub axle 4 which is hollow in the left-hand portion. The electronics unit for controlled current supply to the electric motor 22 is accommodated within the motor vehicle. The electronics unit is designed such that the electric motor 22 may be switched over to perform a braking function.

The, in the normal state, torque-transmitting connection between the rotor 10 and the torque transmission ring 34 may be eliminated by remote actuation (e.g. axial displacement of a coupling member from a multi-groove profile) so that rim 12 may be rotated without the rotor 10 being rotated along therewith. This permits towing of the vehicle without heating of the electric motor.

THIRD EMBODIMENT

The drive unit 202 in its entirety is supported by a stub axle component 204 which in integral manner comprises the sturdy, cylindrical stub axle 206 proper as well as a base 208 having two bores 209. By means of the base 208, the entire drive unit 202 can be attached to a vehicle, not shown. By pivotal motion about the common axis of said bores 209, it is possible to steer the wheel of the vehicle provided with the drive unit 202.

Further to the right, the stub axle 206 supports a rotor 210 of an electric motor 212 by way of two rolling bearings 214. The rotor 210—roughly speaking—has the shape of a disc with a central opening. Around this central opening, the rotor 210 is axially enlarged to form a hub 216. The rotor 210 is axially enlarged in its radially outer portion 218 as well. The radially outer portion 218 is formed with rotor poles radially projecting towards the outside and being separated from each other by axially extending grooves and being connected to each other radially inside by a common back. The radially outer portion 218 is of sheet-metal design, i.e. it consists of a stacked number of metal sheets each arranged in a radial plane transversely of the central axis 220 of the electric drive unit 202 and being electrically isolated from each other.

Rotor 210 is part of the reluctance electric motor 212. The electric motor 212 comprises a stator 212 radially outside from the rotor 210 which analogously to the rotor 210 is of sheet-metal design. The stator 220 also has marked poles with grooves between the poles as well as a connecting stator back radially outside. The stator poles have coils wound thereon, with the so-called winding heads 222 being visible in the drawing that are formed in that the winding wires at the axial end located there leave a groove and in bent fashion are introduced into a different groove. The winding heads 222 at each axial end exceed the stator iron in axial direction by a dimension a. Between the inner circumference of the stator 220 and the outer circumference of the rotor 210 there is provided an air gap 224.

A motor housing 228 consists in essence of the following parts: the stub axle component 204 in the region between rotor 210 and bores 209 is designed in the form of a disc-like portion 226 of considerably increased diameter, which forms a large part of the end wall of the motor housing 228 located there. A second part of the motor housing 228 is formed by a cup-like component 230 having a large central opening. The centrally open bottom of component 230, in the assembled state, is closed by the disc-like portion 226 the remainder of the bottom constitutes an annular outer part of the end wall of the motor housing 228 located there. The circumferential wall of the cup-like component 230 constitutes the circumferential wall 232 of the motor housing 228.

On the left-hand side of the drawing, the completely open side of the cup-like component 230 is followed by a gear casing 234. The gear casing 234 consists substantially of three components: (1) a main part 236 extending radially inwardly from the connection to the cup-shaped component 230 of motor housing 228 and, in doing so, being cranked twice towards the right. (2) A cover-like component 238 on the right-hand side, which continues radially inwards up to a central opening of the gear casing 234. (3) A cover-like component 240 on the left-hand side, which on the left-hand side of a planetary gear system 242 extends radially inwardly up to a central opening.

The main constituent part 236 of gear casing 234, in the radially outer portion thereof, terminates the electric motor 212, to be precise the stator 220 of the same, towards the left-hand side. Radially inside from the winding head 222 on the left-hand side of the drawing figure, the main part 236 is bent towards the right and, shortly before the radial outer portion 218 of the rotor 210, it changes again to a radial path. Radially inside from the portion 218 of the rotor 210, the main part 236 is widened in axial direction towards the right. This portion is followed by the cover-like component 238 on the right-hand side, which constitutes the continuation of the gear casing on the right-hand side of the planetary gear system 242. The cover-like component 240 on the left-hand side closes off the planetary gear system 242 on the left-hand side thereof.

The main part 236 and the cover-like component 238 on the right-hand side thus are constituent parts of the gear casing 234 on the one hand, but on the other hand they also conclude the interior of the electric motor 212 on the left-hand side thereof.

Inside the planetary gear system 242 there is provided a planet carrier 244 supporting several axially extending bolts 246 distributed over the circumference thereof. Each bolt rotatably supports a stepped planet wheel 248. The partial region of each stepped planet wheel 248 of larger diameter is provided with a toothed portion 250 on its outer circumference. The toothed portion 250 is in mesh with a sun wheel 252 to be described in more detail further below. The portion of each stepped planet wheel 248 of smaller diameter, which is arranged axially on the right-hand side beside the larger-diameter portion, is provided with a toothed portion 254 on the outer circumference thereof. The toothed portion 254 meshes with an internally toothed, stationary ring gear 256 which is either formed integrally in the main part 236 of the gear casing 234 or is inserted therein as a separate part.

The afore-mentioned sun wheel 252 is a—roughly speaking—hollow cylindrical component, with the stub axle 206 penetrating the inside thereof. On a right-hand partial length, the sun wheel is introduced into a central bore of the hub portion 216 of the rotor and is connected to the rotor 210 there in non-rotatable manner. In a left-hand partial length, the sun wheel is provided with an externally toothed portion 252 and, as already mentioned, meshes with all circumferentially distributed stepped planet wheels 248.

The planetary gear system 242 is constituted by the afore-described parts sun wheel 252, stepped planet wheels 248, stationary ring gear 256 rotatable planet carrier 244. It can be seen that the teeth 250 of the planet wheels 248 meshing with the sun wheel 252 extend to a lesser extent towards the left-hand side in the drawing figure than the left-hand side winding heads 222 of the stator 220 of the electric motor 212. The teeth 250 are located axially beside the radially outer portion 218 which represents the portion of the rotor 210 adjoining the air gap 224. Those teeth 250 located at the very top in the drawing figure are spaced from the central axis 207 by a radial distance which is smaller than the radius of the air gap 2024, but greater than the radius at the transition from the radially outer portion 218 of the rotor 210 to the disc-like portion of the rotor 210.

This situation may also be envisaged as a cylindrical enveloping surface which surrounds all maximum diameters of all planet wheels 240 on the outside, i.e. establishes contact with each individual toothed portion 250 of a particular planet wheel 248 for a short circumferential distance only. This enveloping surface may have ascribed thereto a diameter or radius and an axial width corresponding to the axial width of the toothed portion. This imaginary enveloping surface so to speak is arranged inside the angular space confined axially on the right-hand side by the radially outer portion 218 or the intermediary wall of the casing main part 236 and confined radially outside by the inner circumference of the entirety of the left-hand winding heads 222 or the intermediary wall of the casing main part 236 provided there. Without leaving the scope of the invention, the planetary gear system 242 may also be designed such that the planet wheels 248 extend a bit further towards the left-hand side, i.e. such that the toothed portions 250 have their left-hand side end portions project towards the left-hand side to a farther extent than the winding heads 222 on the left-hand side.

To the left from the planet wheels 248, the stub axle 206 has a wheel carrier 258 supported thereon, by means of two spaced apart rolling bearings 260. The wheel carrier 258 consists of a hub portion 262 and of a disc-like portion 264. The disc-like portion 264 has a brake drum 266 and a tire rim 268 attached thereto. A tire located on the rim 268 when the drive unit 202 is ready for operation is not illustrated.

On the right-hand side, the hub portion 262 of the wheel carrier 258 has a portion projecting beyond the disc-like portion 264 and having an axially extending multi-groove profile 270 provided on its outer circumference. The planet carrier 244 has a complementary multi-groove profile in its inner bore and by way of this profile is slid onto the multi-groove profile 270 of the wheel carrier 258. This provides for a torque-transmitting connection between planet carrier 244 and wheel carrier 258.

In the right-hand end portion of the hub portion 216 of rotor 210 there is positioned a sealing ring 272 sealing the interior of the motor housing 228 with respect to the bearings of rotor 210. In the left-hand end portion of the hub portion 216 of rotor 210 there is positioned a sealing ring 274 sealing the interior of the electric motor 212 with respect to the interior of the planetary gear system 242. The sealing ring 272 is located between the hub portion 216 of rotor 210 and the stub axle component 204. The sealing ring 274 is located between the hub portion 216 of the rotor 210 and the inner bore of the right-hand cover part 238. Between the inner bore of the left-hand cover part 240 and the outer circumference of an axial extension 276 of the planet carrier 244 projecting towards the left-hand side, there is provided a sealing ring 278 sealing the interior of the planetary gear system 242 with respect to the outer surroundings. Between the hub portion 258 and a component 280 non-rotatably mounted on the left-hand end portion of the stub axle 206 there is provided a sealing ring 282 sealing the supporting space of the wheel carrier 258 with respect to the outer surroundings. The sealing ring 278 cooperating with the planet carrier 244 is arranged in a location that is radially larger than the right-hand bearing of the wheel carrier 258 but neither extends beyond this bearing 260 axially on the left-hand side or axially on the right-hand side.

Furthermore, it can be seen that the inner periphery of the radially outer portion 218 of the rotor, at the location where this portion is located to the right of the disc-like portion of the rotor 210 is designed as a brake drum 284. Together with brake pads 286 there is formed an emergency and parking brake for the vehicle there. A cable or also a hydraulic line for operating the drum brake 284, 286 may expediently be passed through the disc-like enlarged portion 226 of the stub axle component 204.

The already mentioned component 280 is non-rotatably mounted on the left-hand end of stub axle 206. The component 280 has a brake carrier 288 mounted thereto. Attached to the brake carrier 288 are the non-rotary constituent parts of a service brake, not illustrated, of the drive unit 202. The brake shoes of this service brake act from inside against the inner periphery of the rotating brake drum 266. By detaching the brake carrier 288 towards the left, the service brake is accessible for brake lining replacement.

The cup-shaped component 230, upon release of connecting screws to the disc-like enlarged portion 226 and release of connecting screws to the main part 236 of the gear casing 234, may be removed from the drive unit 202 axially towards the right-hand side. In doing so, the stator 220 is detached as well. The disc-like portion 226 has an outer diameter that is sufficiently small to permit also a radially outer portion of the rotor 210 to be unmounted axially towards the right-hand side.

Radially outside on the stator 220 there is illustrated a small axially extending metal tube 290 in an exaggerated size. The tube 290 is arranged in an outer, axially extending groove on the outer circumference of the stator 220 and is in engagement with an axially extending groove of the circumferential portion 232 of the motor housing 228. Distributed over the circumference of the stator 220, there is positioned a multiplicity of such small tubes 290. They all have their left-hand ends connected to a coolant supply and their right-hand ends to a coolant discharge.

Means for circulating air within the motor housing 228 are not illustrated. Possible are e.g. extensions in the form of fan blades at a suitable location of the rotor 210.

On the right-hand end wall of the motor housing 228, there can be seen a connector element 292 through which electrical connections can be established, by way of one or more connectors, between the stator 220 and the body of the vehicle located to the right of the drawing figure, and through which coolant connections can be established between the stator 220 and the body of the vehicle. In addition thereto, a tire pressure regulating valve 294 is schematically illustrated in rim 268. A pressurized-air line 296 extends through a central bore of the stub axle component 204 and, as of a rotatable connection, then extends through a wheel-cap-like component 298 to the tire pressure regulating valve 294. The central bore of the stub axle component 204 also provides for the electric or hydraulic or pneumatic connection of the brake system to the brake carrier 288.

The embodiment has demonstrated that the invention permits an extremely expedient kind of support of rotor 210 and wheel carrier 258. The rotor 210 and the wheel carrier 258 are each supported on both sides of the plane in which the radial force is applied.

Suitable separating locations of torque transmission connections in the embodiment are the multi-groove connection between rotor 210 and sun wheel 252 as well as the multi-groove connection between planet carrier 244 and wheel carrier 258.

Figure 4:
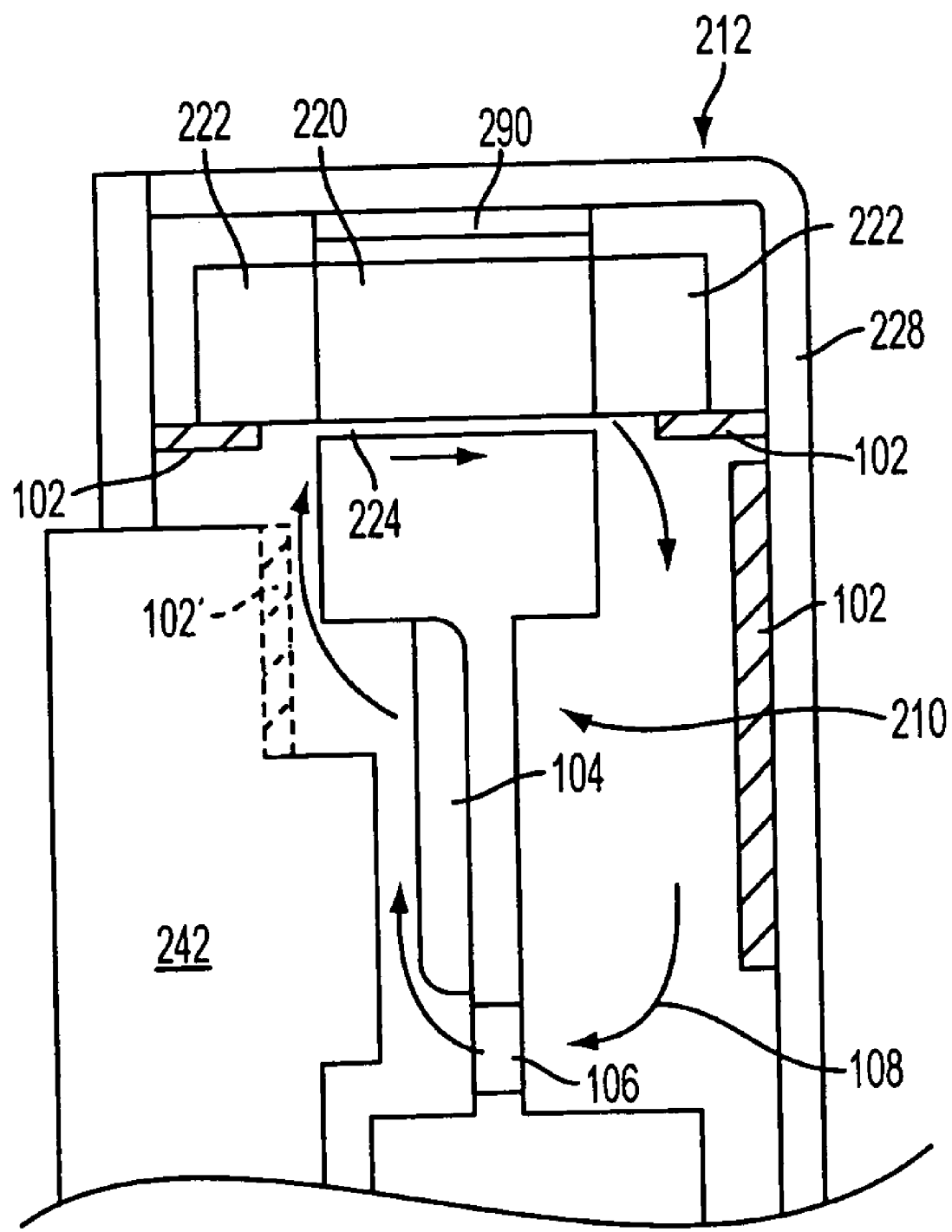
FIG. 4 shows a more schematic view of a core portion of the drive unit of FIG. 3, illustrating some modifications.

FIG. 4 illustrates the manner in which heat-dissipating metal members 102 can be provided in drive unit 202. A first illustrated possibility is a location radially inside adjacent the winding heads 222, on the left-hand side and on the right-hand side. These metal members 102 have the configuration of hollow cylinders. A second possibility consists in attaching the same inside, on the right-hand face side of the motor housing 228; in that event, the metal member 102 has the shape of a flat circular ring. Normally, either the first possibility or the second possibility is realized, however, it is also possible to realize both thereof together.

A third possibility, illustrated in broken lines, consists in attaching the same to the partition 236 between electric motor 212 and gear system 242. This metal member 102' discharges heat from the gear system 242 in the most direct fashion.

The metal member 102 and 102' preferably consist of aluminum in order to keep the eddy current losses as low as possible.

The metal members 102 are preferably connected, e.g. by means of suitable small tubes, not shown, to the liquid cooling system to which also the small tubes 290 are connected. As an alternative, it is possible to make use of metallic thermal conduction of the metal members 102 through the motor housing 228 to the small tubes 290. The metal member 102' may also be connected to the liquid cooling system by way of small tubes.

In the case illustrated in FIG. 4, the rotor is provided with blades 104 and openings 106 extending between the left-hand rotor side in FIG. 4 and the right-hand rotor side in FIG. 4. There are provided several openings 106 in circumferentially distributed manner across rotor 210. The openings 106 are located quite far inside in radial direction, shortly outside of the hub 216. The effect achieved by the design described is that a circulating airflow 108, as indicated by arrows, is generated inside the electric motor 212 upon rotation of rotor 210. The airflow 108 passes on the left-hand rotor side from the openings 106 in radially outward direction under the influence of the blades 104, then passes through the air gap 224 of the electric motor 210 to the right-hand rotor side and from there radially towards the inside and back to the openings 106.

It is also possible to do without openings 106. In that event, there is a circulating airflow each at the left of the rotor 210 and at the right of the rotor 210, with said airflow passing close to the rotor 210 in radially outward direction and remoter from the rotor 210 again in radially inward direction.

It is also possible to do without blades 104. The rotor 210 entrains the air close to the same in circumferential direction. There are thus generated centrifugal forces in the air, effecting an airflow in radially outward direction.

Heat-dissipating metal members, like metal members 102 shown in FIG. 4, may also be provided in embodiments of the invention making use of an external rotor (cp. e.g. embodiments according to FIGS. 1 and 2). In the embodiment according to FIG. 4, an air/liquid heat exchanger, e.g. analogous to the heat exchanger 56 of the embodiment of FIG. 1, may be provided instead of the metal members 102 or in addition to the same.

It holds for all of the embodiments that the air/liquid heat exchanger 56 is most favorably incorporated in the other liquid cooling system cooling the stator 20.

The invention claimed is:
1. An electric drive unit for a motor vehicle, comprising:
 (a) an electric motor comprising a non-rotating stator, a rotatable rotor, and a motor enclosure;
 (b) a planetary gear system comprising a rotatable input connected to the rotor for torque transmission, a rotatable output, and a gear system enclosure;
 (c) a rotatable wheel carrier that is connected to the output of the planetary gear system for torque transmission from the planetary gear system to the wheel carrier;
 (d) a stub axle component supporting the electric motor, the planetary gear system and the wheel carrier, the stub axle component comprising a cantilever member including:
  a mounting portion for mounting the drive unit to the motor vehicle, the mounting portion defining a first, supported end of the stub axle component, and
  a non-rotating stub axle portion extending from the mounting portion of the stub axle component into an interior region of the electric motor, an interior region of the planetary gear system, and an interior region of the wheel carrier, the non-rotating stub axle portion defining a second, unsupported end of the stub axle component;
 (e) wherein the rotor of the electric motor, the input of the planetary gear system, the output of the planetary gear system, and the wheel carrier are rotatably supported by the non-rotating stub axle portion;

(f) a partition wall between the electric motor and the planetary gear system, said partition wall being part of both the motor enclosure and the gear system enclosure;
(g) a liquid cooling system providing cooling of the stator, wherein the stator comprises an outer circumference, and the liquid cooling system comprises a plurality of axially-oriented coolant distributing tubes arranged around the outer circumference of the stator;
(h) an air cooling system operating by air circulating inside the motor enclosure and not being in flow connection with ambient air, said circulating air providing cooling of the rotor and being in contact with the partition wall; and
(i) an air/liquid heat exchanger provided as a heat sink in the electric motor for taking up heat from the circulating air thereby re-cooling the circulating air, the air/liquid heat exchanger being incorporated into the liquid cooling system of the stator.

2. The drive unit according to claim 1, wherein at least one of the rotor or a surface of the partition wall directed towards the electric motor is designed to have surface roughness.

3. The drive unit according to claim 1, wherein at least one of the rotor, or a surface of the partition wall directed towards the electric motor includes turbulence generators.

4. The drive unit according to claim 1, wherein the rotor has flow directing areas acting like blades in order to generate an airflow with a radial component.

5. The drive unit according to claim 1, wherein the rotor has openings extending between the rotor side closer to the planetary gear system and the rotor side remoter from the planetary gear system.

6. The drive unit according to claim 1, wherein the air cooling system absorbs, through the partition wall between the electric motor and the planetary gear system, a substantial part of the lost heat of the planetary gear system.

7. The drive unit according to claim 1, further comprising an additional heat sink in the electric motor for taking up heat from the circulating air, the additional heat sink comprising a heat-dissipating metal member.

8. The drive unit according to claim 1, wherein the electric motor comprises an external rotor.

9. The drive unit according to claim 1, wherein the electric motor comprises an internal rotor.

10. The drive unit according to claim 1, wherein the electric motor exerts permanent-magnetic excitation on the rotor.

11. The drive unit according to claim 1, wherein the electric motor acts as a brake.

12. The drive unit according to claim 1, wherein the planetary gear system comprises stepped planet wheels.

13. The drive unit according to claim 1, wherein the planetary gear system is dismountable from the drive unit in the form of a module.

14. The drive unit according to claim 1, wherein the planetary gear system together with a wheel carrier part is dismountable from the drive unit in the form of a module.

15. The drive unit according to claim 1, wherein a releasable connection is provided in the torque transmission path between the electric motor and the planetary gear system.

16. The drive unit according to claim 1, wherein the wheel carrier includes at least one of a brake disk or a brake drum.

17. The drive unit according to claim 1, further comprising a tire rim attached to the wheel carrier.

18. A motor vehicle comprising at least one electric drive unit according to claim 1.

19. The drive unit according to claim 1, further comprising grooves formed in the outer circumference of the stator, wherein the axially-oriented coolant distributing tubes are located in the grooves.

* * * * *